United States Patent

Collet

[15] 3,706,119
[45] Dec. 19, 1972

[54] CALENDERING ROLL

[72] Inventor: Etienne Collet, 4 bis, avenue Halphen, Ville D'Avray, France

[22] Filed: Sept. 17, 1970

[21] Appl. No.: 73,008

Related U.S. Application Data

[63] Continuation-in-part of Ser. No. 686,661, Nov. 29, 1967, Pat. No. 3,543,366.

[30] Foreign Application Priority Data

Nov. 30, 1966 France..................................6685516

[52] U.S. Cl. ................................................29/113 R
[51] Int. Cl. .............................................B21b 31/32
[58] Field of Search....29/113 AD, 113 R; 100/167 B

[56] References Cited

UNITED STATES PATENTS

| | | | |
|---|---|---|---|
| 2,648,122 | 8/1953 | Hornbostel | 29/113 AD |
| 3,050,829 | 8/1962 | Appenzeller | 29/113 AD |
| 3,056,440 | 10/1962 | DeMello | 29/113 R |
| 2,607,072 | 8/1952 | Johnson | 29/113 R |

FOREIGN PATENTS OR APPLICATIONS 6,716,264  5/1968  Netherlands.....................29/113 AD

*Primary Examiner*—Alfred R. Guest
*Attorney*—Norman S. Blodgett

[57] ABSTRACT

This invention relates to a calendering roll and, more particularly, to a roll for use in the treatment of the surfaces of strip materials, the shape of the surface of the roll being adjustable by means of inflatable resilient cushions arranged internally along its axis of rotation.

4 Claims, 15 Drawing Figures

PATENTED DEC 19 1972

INVENTOR:
ETIENNE COLLET
BY Moran L. Blodgett
ATTORNEY

CALENDERING ROLL

This application is a continuation-in-part of my patent application Ser. No. 686,661, filed Nov. 29, 1967 now U.S. Pat. No. 3,543,366.

BACKGROUND OF THE INVENTION

Calendering systems usually include at least one rotating roll which contacts, with a greater or lesser degree of pressure, the material to be treated, the latter being held by a support surface. Usually, such a system comprises two or more rolls arranged to contact one another along generatrices under the effect either of their own weight or of a supplementary force, such a force generally being exerted on the journals of the upper roll. The pressure zones each comprise a narrow strip on either side of the theoretical generatrix of contact between two cylinders. However, under the effect of the opposed pressure exerted by the coating cylinders, each cylinder is subjected to a bending force directed toward the side opposite to the pressure zone of the cylinder; this bending force has a harmful effect on the distribution of pressure over the contact surface of the cylinder as a whole and makes this distribution irregular. This gives rise to serious difficulties; various means have already been proposed for overcoming these inconveniences.

Thus, use may be made of cylinders which are given a symmetrical convex curvature in advance, but it is very difficult to predetermine exactly the necessary degree of convex curvature and it is impossible to modify this curvature during working. Alternatively, means may be provided for exerting, outwardly from the interior of the roll, a pressure which is localized in the zone of action of the roll. That is to say, it is limited to the region over which the roll contacts the material to be treated and to the support surface. Such an arrangement may comprise one or more chambers which are inside the roll and between the shaft and the cylinder wall which form the said roll and which are parallel to the shaft; a fluid distribution system permits an appropriate pressure to be exerted in that longitudinal chamber which is closest to the working generatrix of the cylinder.

These arrangements for overcoming the problems raised by the bending of calender rolls leave much to be desired either because of their insufficiency or because of the mechanical complications which they involve. Thus, when materials in web form are to be passed between the rolls (for example, in the glazing of paper or for rolling plastics) defects frequently appear in the widthwise direction of the web and persist over a very considerable length of the latter. These and other difficulties experienced with the prior art devices have been obviated in a novel manner by the present invention.

It is, therefore, an outstanding object of the invention to provide a calendering roll that enables the difficulties of the prior art to be overcome in a fairly simple manner without requiring the use of any complicated or costly devices and using only components which are readily available.

Another object of this invention is the provision of a calendering roll which makes it possible for perfectly uniform rolled products to be obtained consistently; for example, in the case of the glazing of paper, the application of the invention leads to the manufacture without any difficulty, of any desired length of web which is quite regularly glazed and which does not show any defect.

A further object of the present invention is the provision of a calendering roll with which the defects previously mentioned as appearing on the web and persisting over a considerable length thereof can be eliminated during operation.

It is another object of the instant invention to provide a calendering roll such that it is possible to use rolls which apply a lighter pressure and which are, therefore, more easily manageable, have a smaller inertia and involve less risk of wear.

With these and other objects in view, as will be apparent to those skilled in the art, the invention resides in the combination of parts set forth in the specification and covered by the claims appended hereto.

SUMMARY OF THE INVENTION

In general, the invention relates to an improved roll which can be used for carrying out various operations which involve pressing. It is useful, particularly in those operations using at least one roll or cylinder which rotates in contact with a support surface; such operations include rolling, calendering, embossing, glazing, coating, printing, drying, and grinding. The invention is also concerned with a new roll which enables the improved process to be carried into effect; the roll, according to the invention, can be used with advantage in various branches of industry, particularly in connection with paper-making, in the working of plastics materials and rubber, in printing, metallurgy, paint manufacture, and the manufacture of foodstuffs. For the sake of simplicity, reference will be made in this specification to rolls for "calendering" and the invention will be described hereinafter in its application to calendering rolls. However, it is to be understood that the invention covers all other applications of similar rolls or cylinders, for the treating of material in sheet, strip, or any other form.

The improved calendering or rolling process, according to the invention, using one or more rolls, consists in subjecting all or part of the internal surface of the or at least one of the rolls, which is hollow, to a pressure directed radially from the interior towards the exterior of the roll by resilient means disposed inside the hollow roll, the resilient force of the said means being directed uniformly in each radial plane about an axis parallel to the axis of the roll.

According to one important characteristic of the invention, the said force is adjustable along the length of the roll; in other words, the force is different in different radial planes, that is to say, in different planes perpendicular to the axis of the resilient means and to the axis of the roll. According to one particularly advantageous embodiment, the internal pressure acting on the wall of the roll is strongest in the central region of the roll and weaker at the ends. The resilient means may turn at the same time as the roll, or remain stationary, while exerting pressure on the internal wall of the roll.

In a modification of the invention, a force tending to bend the shaft of the roll is applied in a direction perpendicular to the rolling plane to the ends of the shaft where they project beyond the ends of the roll. The roll comprises a rotatable cylindrical casing, a rotatable or stationary shaft mounted on the geometrical axis of the casing, and a resilient means between the shaft and the internal wall of the casing provided for the purpose of exerting a predetermined pressure on the said wall, the said means being mounted symmetrically on an axis parallel to the said shaft and being connected to pressure-regulating means externally of the roll. The invention can be carried into effect using resilient means whose axis coincides with that of the roll, or else is parallel but is off-center.

One particularly advantageous embodiment is based on the unexpected discovery that it is possible to use a plurality of rimmed wheels fitted with pneumatic tires and mounted on the shaft, these wheels and tires having dimensions such that the tires are able to come into close contact with the internal wall of the roll, or with the internal wall of a support cylinder situated inside the roll.

When the said rimmed wheels are mounted on the shaft of the roll, there are two possibilities: the hubs of the wheels which carry the pneumatic tires may be fixed to the shaft, or they may turn freely thereon. This corresponds to two methods of using the roll: either it may rotate by being driven by the shaft, or it may be mounted for free rotation about a stationary shaft. In the first of these cases, the tightening or loosening of the tires relative to the internal wall of the casing, due to inflation or deflation thereof, can serve for the transmission of driving power from the shaft to the casing.

Means is provided for the inflation of the said tires with a fluid which is generally air but which could be some other gas or possibly a liquid. In particular, these means may be constructed to permit the tires of the individual wheels, or of groups of wheels, to be inflated separately and independently of the other wheels or wheel-groups during rotation of the roll.

The roll, according to the invention, or an installation comprising such a roll, can be provided with a device for exerting on the ends of the shaft of the roll a pressure which is capable of producing slight bending on the shaft. The cylindrical casing of the roll of the invention can be made of any of the usual materials and can be of a thickness which will not require prohibitive pressures to be exerted to correct the flexing effected according to the invention. In particular, it may be made of metal, such as steel, bronze or aluminum alloy, or of a synthetic plastics material. It is customary to employ rolls which are lined with a material which is resilient or flexible to a greater or lesser degree, such as rubber or synthetic plastics material.

In one particular embodiment of the invention, the cylindrical casing of the roll (that is to say, the actual hollow body of the cylinder forming the roll) has longitudinal slots or grooves extending through the thickness of the casing parallel to the generatrices of the cylinder and stopping at a certain distance before each of the ends of the roll. In this way, a high degree of resilience is given to the body of the roll, and this lends itself particularly well to the action of the internal pressure; this pressure may, in certain cases, cause the roll to assume a shape resembling that of a barrel, thus effectively opposing undesirable flexing due to working of the roll. Rolls of this type are preferably covered with an external protective material.

In the constructional form in which the resilient means are contained in a support cylinder, the latter can have an external diameter equal to or smaller than the internal diameter of the roll; it can be fixed or it can turn.

The fixed support cylinder can be accompanied by a compensating device which lowers the coefficient of friction between the fixed support cylinder and the movable roll. This device may be either a metal bearing, such as, for example, a ball bearing, a roller bearing or a needle bearing, or it may be a fluid bearing.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
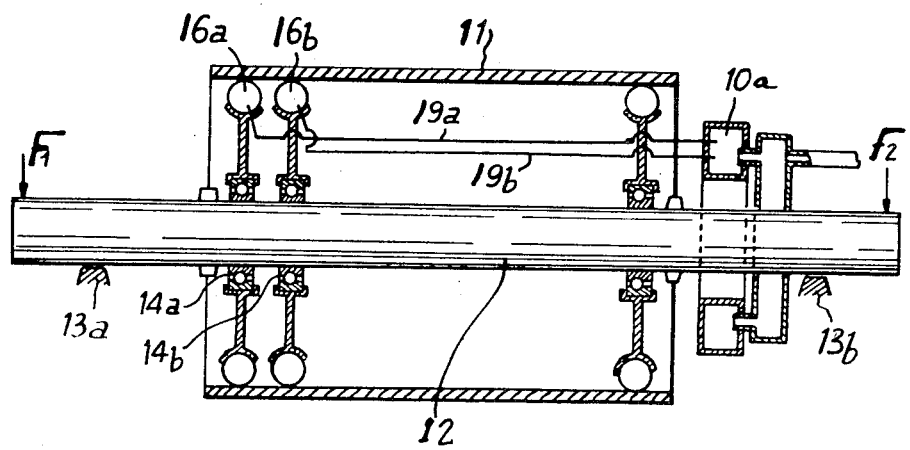
FIG. 1 is an axial sectional view of a calendering roll embodying the principles of the present invention.

FIG. 1 shows a calendering roll in which a non-rotatable shaft 12 is fixed between two supporting bearings 13a and 13b. The wheels 16a, 16b . . . 16n are mounted on corresponding anti-friction bearings 14a, 14b, etc. so as to turn on the shaft 12. A special distributor 10a provides the supply of fluid to the chambers. A bending of the shaft 12 is brought about by the action of two forces $F_1$ and $F_2$ on the ends of the shaft 12.

Figure 2:
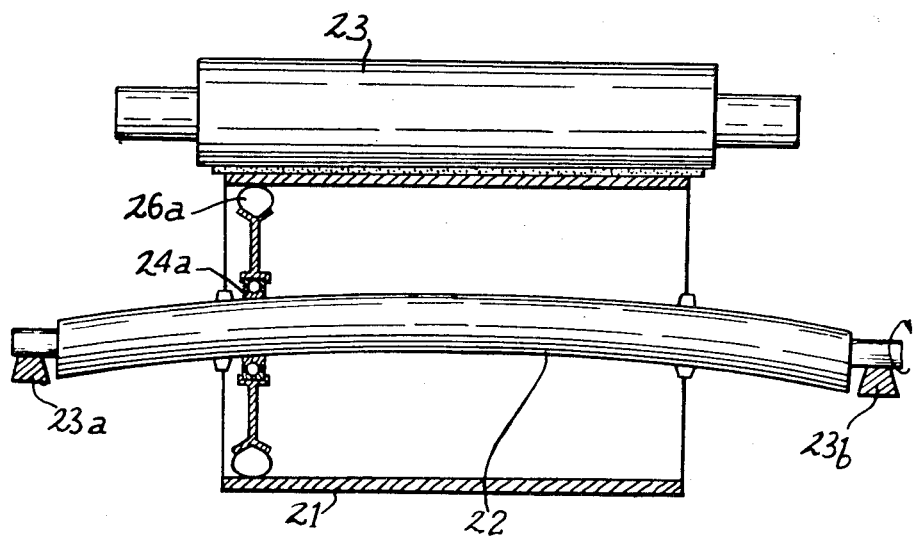
FIG. 2 is an axial sectional view of a modified form of the invention.

The roll shown in FIG. 2 has a shaft 22 which is permanently bent; pressure variations are obtained by means of the tire 26a on the line of contact of the cylinders by causing a slight turning movement of the shaft, which then remains stationary during the rolling operations. Ball and socket joints make it possible for the device to be rotated when the shaft is bent.

Figure 3:
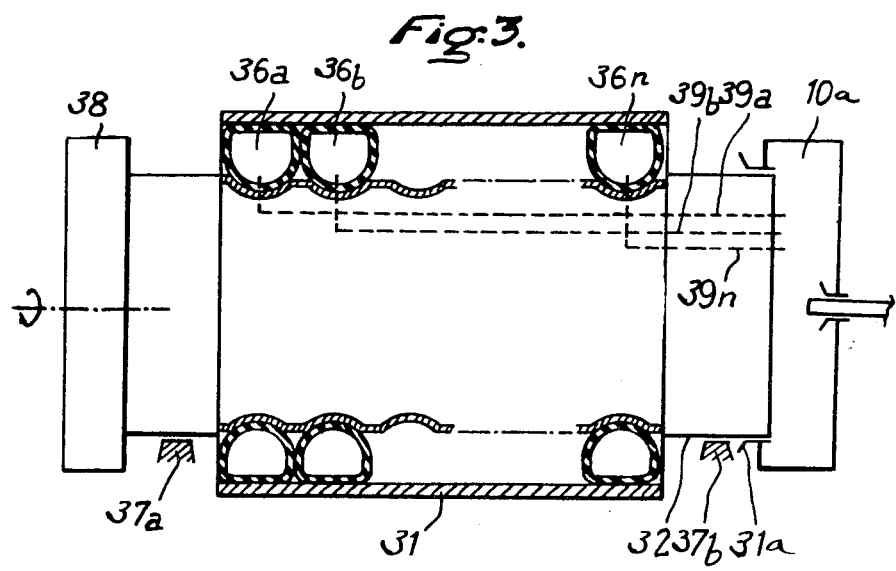
FIG. 3 is an axial sectional view of another modification of the invention.

FIG. 3 shows a modified form of roll in which the wheels are omitted and replaced by grooves formed directly in the shaft 32; the diameter of the shaft 32 may then be substantially larger. The said chambers are seated directly in these grooves. The casing 31 envelopes a series of resilient elements 36a, 36b . . . 36n which, in turn, lie in grooves formed on a hollow shaft 32. The shaft is mounted in bearings 37a and 37b. At one end the shaft is provided with a head 38, while at the other end a manifold 10a provides pressure air through conduits 39a, 39b . . . 39n to the resilient elements 36a, 36b . . . 36n, respectively. A slip joint 31a lies between the shaft and the manifold.

Figure 4:
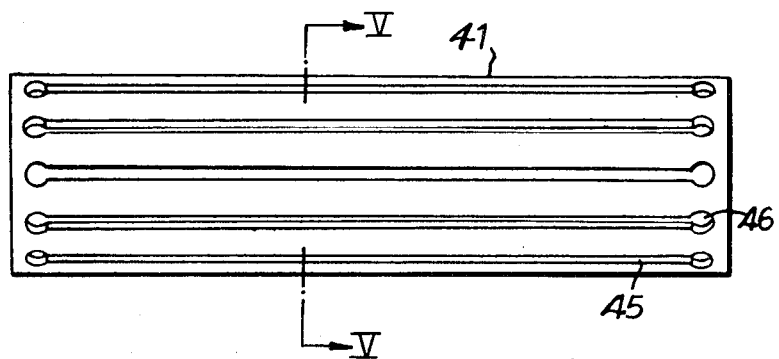
FIG. 4 is an elevational view of a modified form of the invention.
Figure 5:
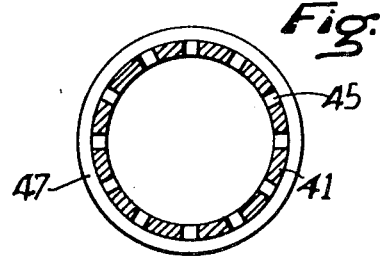
FIG. 5 is a transverse sectional view of the roll shown in FIG. 4 taken on the line V-V.
Figure 10:
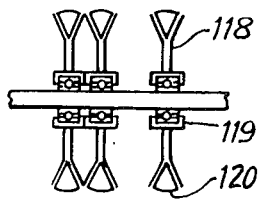
FIG. 10 is a longitudinal view of another modification of the invention.

FIGS. 4 and 5 illustrate diagrammatically one particular embodiment of the roll according to the invention which is designed so as to have a greater resilience and to lend itself more easily to the action of the radially applied internal pressure. The roll 41 in this case comprises a series of longitudinal grooves or notches 45 which are terminated in the end regions of the cylinder by stop holes 46. These slots transform the wall of the cylinder into an assembly of strips of which the freedom for elastic deformation is greater than that of a completely continuous cylinder. The cross-sectional view of FIG. 10 shows a covering 47 which may be of rubber, plastics material or of any flexible material in general, possibly even a thin sheet of steel or other sufficiently flexible metal.

In general terms, it is to be understood that, in the arrangement of the present invention, the nature and the thickness of the walls of the cylinder forming the roll and the radial internal pressure can be so adapted that the cylinder can be subjected to resilient deformation under the action of this pressure.

Figure 6:
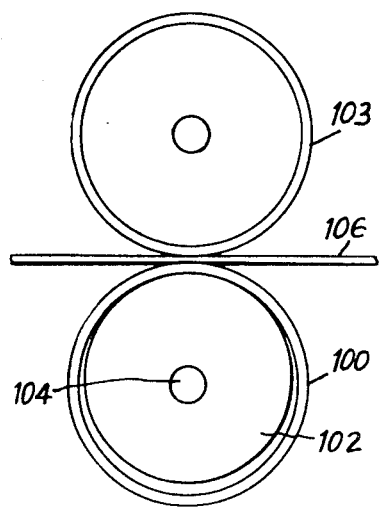
FIGS. 6 through 9 are transverse sectional views of modified forms of the invention.

FIG. 6 shows diagrammatically a hollow roll 100 according to the invention which turns about a shaft 104. A cylinder 102, referred to as the support cylinder, also turns about a shaft, is provided with resilient elements and anti-friction bearings in the manner shown in FIG. 1, and causes the roll 100 to be applied against the counter-cylinder 103. The cylinder 102 has a diameter almost equal to the internal diameter of the cylinder 100. The strip or web 106 which is to be treated passes between the cylinder 100 and the counter-cylinder 103.

Figure 9:
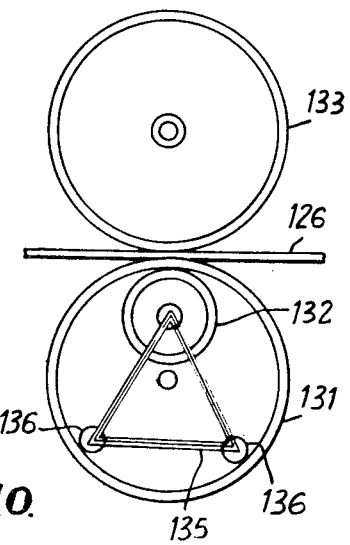

When the arrangement of FIG. 9 is operating, the cylinder 100, which is turning, is subjected to the action of the support cylinder 102, which is also turning, and rolls the material 106 against the opposed cylinder 103 which is also turning. When there is a tendency for flexing of the cylinder 100 to occur, the necessary pressure is applied to the interior of the chambers of the support cylinder 102 in order to counteract the effect of this flexing. If defects still appear on the web of rolled product, it is frequently very desirable to increase the pressure in the chambers of the corresponding region of the roll. The cylinder 100 rolls about the cylinder 102 as the latter turns.

Figure 7:
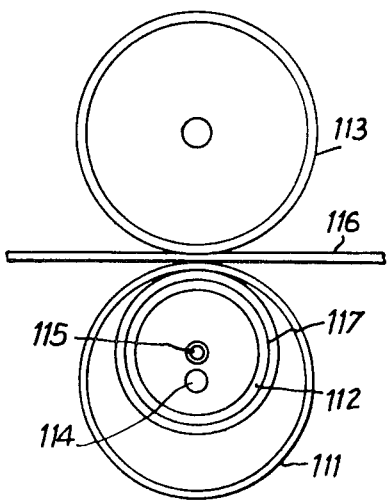

FIG. 7 shows a roll 111 comprising a support cylinder 112 constructed with resilient elements and bearing in a manner similar to FIG. 1. The diameter is substantially smaller than the diameter of the support cylinder 102 of FIG. 6. The roll 111 turns about a shaft 114 and rolls material 116 against the counter-cylinder 113. The support cylinder 112 is fixed inside the roll 111. A needle bearing 117 permits the coefficient of friction between the fixed support cylinder 112 and the movable cylinder or roll 111 to be reduced.

When the arrangement of FIG. 7 is operating, the cylinder 111, which is turning, is subjected to the action of the fixed support cylinder 112. The movable bearing 117 reduces the coefficient of friction between the support cylinder 112 and the movable cylinder or roll 111.

Figure 8:
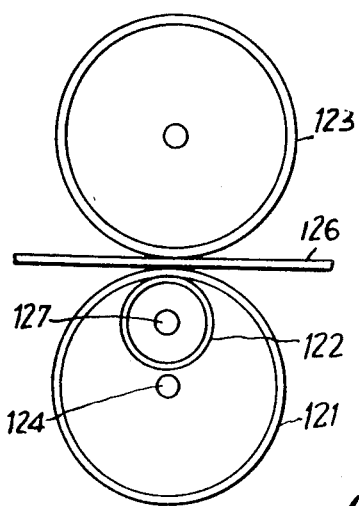

FIG. 8 shows a roll 121 which turns about a shaft 124 and which contains a support cylinder 122. This cylinder 122 of smaller diameter than the diameter of the roll 121 turns about a shaft 127 and is provided with resilient elements and bearings in the manner shown in FIG. 1. The material 126 to be treated passes between the roll 121 to which an outwardly acting pressure is applied by means of the support cylinder 122 and the counter-cylinder 123.

FIG. 9 shows a modified arrangement which comprises a support cylinder 132 which is held centered inside the roll 131 by means of two rollers 136 mounted to be loose on their spindles, the support cylinder 132 and the rollers 136 being connected to one another by beams 135. The hollow cylinder 131 rolls on the idle rollers 136 and on the support cylinder 132 which is movable about its axis and which is provided with resilient elements and bearings in the manner shown in FIG. 1.

FIG. 10 shows a sectional view of one particular form of support cylinder. It comprises radial chambers 120 of variable pressure on rimmed wheels 118, which are disposed side-by-side and are mounted on the shaft by means of hubs 119 and anti-friction bearings 120a.

Figure 11:
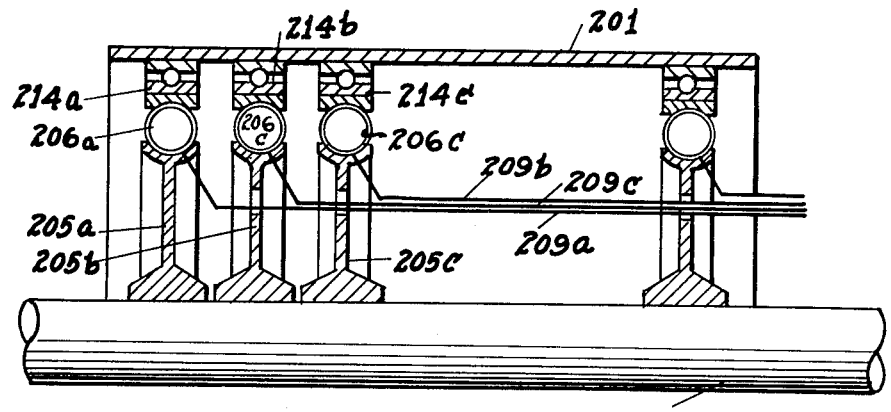
FIGS. 11 through 14 are longitudinal sectional views of modified forms of the invention.

FIG. 11 shows a calendering roll having a casing 201 arranged coaxially of a shaft 202. Resilient elements 206a, 206b, 206c, etc. are mounted on the shaft 202 by means of rimmed wheels 205a, 205b, 205, etc. respectively, while they are provided with pressure air through conduits 209a, 209b, 209c, respectively. Between the resilient elements and the inner surface of the casing are mounted anti-friction bearings 214a, 214b, 214c, etc., respectively.

Figure 12:
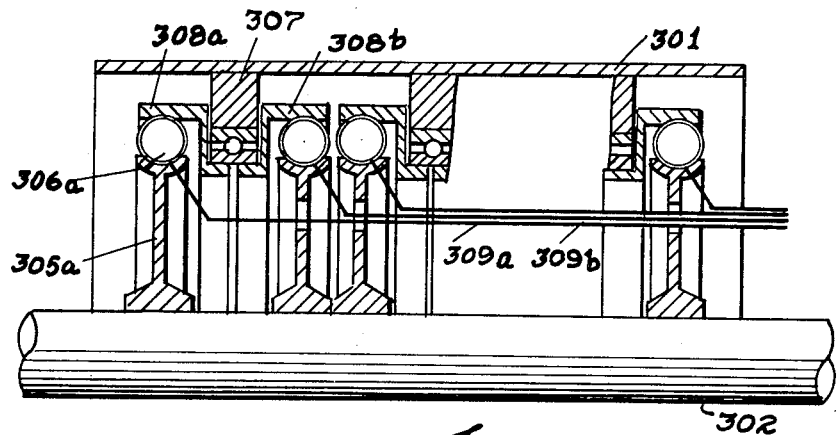

FIG. 12 shows a calendering roll with a casing 301 mounted on a shaft 302 by means including resilient elements 306a, 306b, etc., mounted on wheels 305a, 305b, etc. and having air pressure conduits 309a, 309b, etc. connected thereto. The outer peripheries of the resilient elements 306a and 306b press against tubes 308a and 308b, each having inwardly-directed flanges terminating in tubular flanges to form a groove in which rests the inner race of a ball bearing 314 whose outer race is mounted in a ring 307 mounted in the casing 301.

Figure 13:
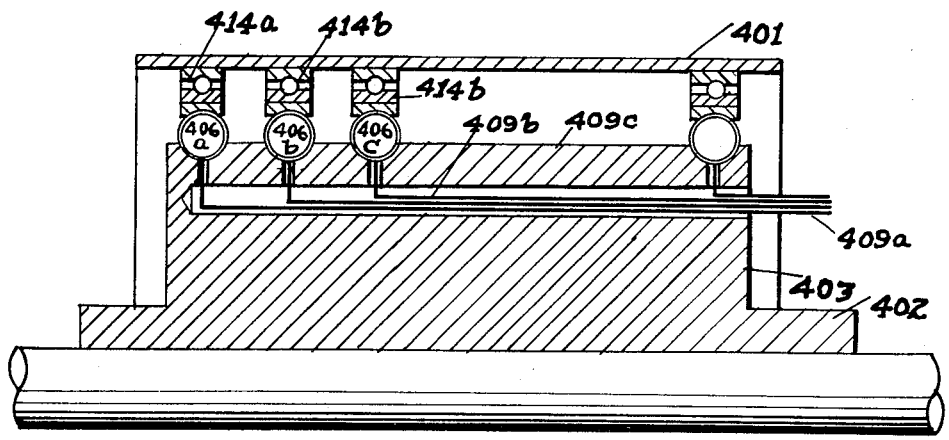

FIG. 13 shows a roll having a casing 401 which is located concentrically of a shaft 402 having an enlarged cylindrical body 403 lying in the casing. Resilient elements 406a, 406b, 406c, etc. are mounted in grooves formed on the surface of the body 403 and are provided with pressure air through conduits 409a, 409b, 409c, etc., respectively. Anti-friction bearings 414a, 414b, 414c, etc. are mounted between the resilient elements 406a, 406b, 406c, etc., respectively.

Figure 15:
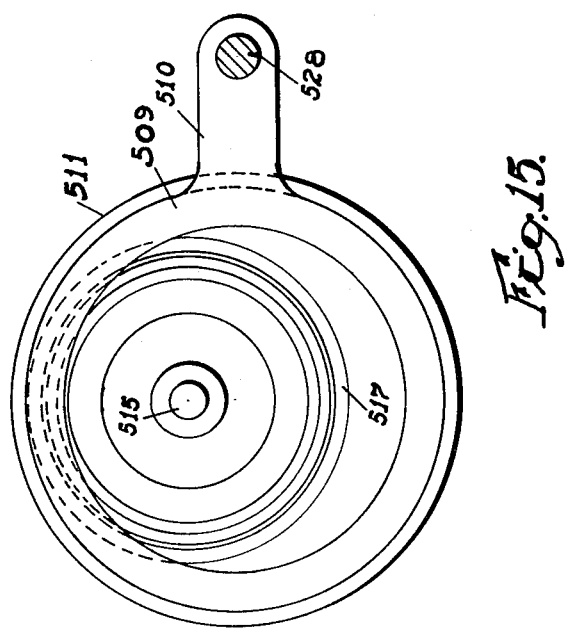
FIG. 15 is an end view of the roll shown in FIG. 14.
Figure 14:
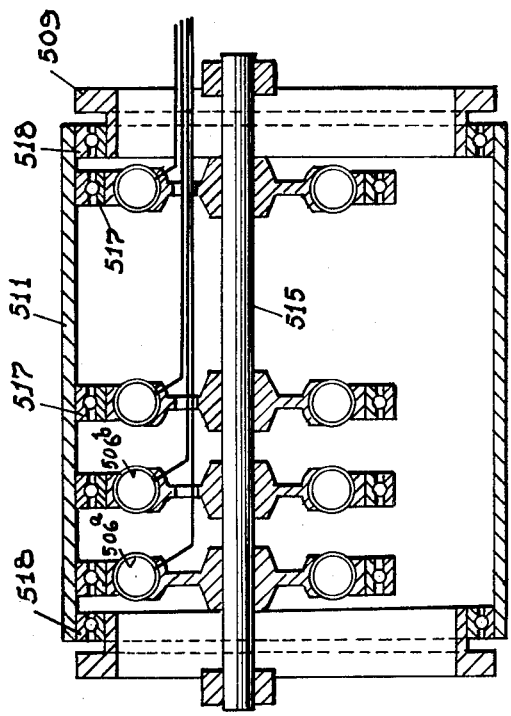

FIGS. 14 and 15 show a roll whose casing 511 is mounted eccentrically of a fixed shaft 515. A series of resilient elements 506a, 506b, etc. are mounted on the shaft by means of rimmed wheels and are provided with pressure air through conduits. Mounted on the resilient elements are anti-friction bearings 517, a portion of whose outer races engage the inner surface of the casing. At each end of the casing is mounted an anti-friction bearing 518 whose inner race is mounted on a flanged disk 509; the disks are provided with radially-extending arms 510 leading to a pivot shaft 528.

It will be clear that the invention is not limited to the details of the embodiments described and that these embodiments are capable of numerous modifications which will suggest themselves to persons skilled in the art without thereby departing from the scope of the invention as defined by the appended claims.

The invention having been thus described, what is claimed as new and desired to secure by letters Patent is:

1. A calendering roll, comprising
   a. a rotatable cylindrical casing,
   b. a shaft mounted at the geometric axis of the casing,
   c. resilient means in the form of a series of annular elements located between the shaft and the casing, which means is capable of exerting a predetermined pressure on the said casing, this means being mounted symmetrically on an axis parallel to the said shaft and being connected to pressure control means provided externally of the roll, and
   d. anti-friction bearings operative between the casing and the shaft in conjunction with the said resilient means, a bearing associated with each annular element, each such set of bearing and annular element being arranged in series radially between the casing and the shaft.

2. A roll as recited in claim 1, wherein the said resilient means comprises a plurality of rimmed wheels fitted with pneumatic tubes, the centers of the wheels being mounted on the axis of the elastic means, while the interior of each of the tubes communicates with a source of fluid under pressure provided externally of the roll.

3. A roll as recited in claim 1, wherein the bearing in each set is located adjacent the casing while the annular element is located adjacent the shaft.

4. A roll as recited in claim 1, wherein the bearing in each set is located adjacent the shaft while the annular element is located adjacent the casing.

* * * * *